(No Model.)

G. M. ROGERS.
CAR COUPLING.

No. 250,844. Patented Dec. 13, 1881.

WITNESSES:
W. W. Hollingsworth
Edw. W. Byrn

INVENTOR:
Geo. M. Rogers
BY
ATTORNEYS.

UNITED STATES PATENT OFFICE.

GEORGE M. ROGERS, OF WAPAKONETA, OHIO.

CAR-COUPLING.

SPECIFICATION forming part of Letters Patent No. 250,844, dated December 13, 1881.

Application filed October 15, 1881. (No model.)

*To all whom it may concern:*

Be it known that I, GEORGE M. ROGERS, of Wapakoneta, in the county of Auglaize and State of Ohio, have invented a new and Improved Car-Coupling; and I do hereby declare that the following is a full, clear, and exact description of the same, reference being had to the accompanying drawings, forming part of this specification, in which—

Figure 1:
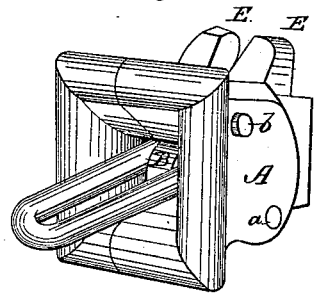
Figure 2:
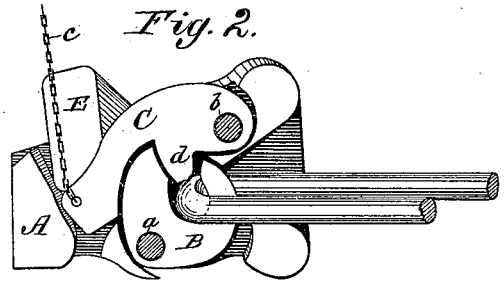
Figure 3:
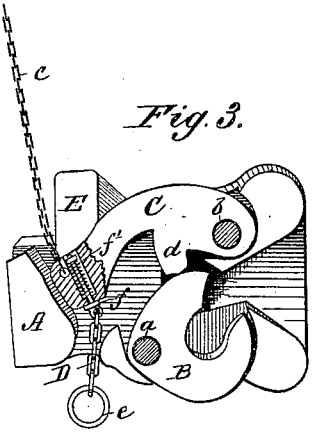

Figure 1 is a perspective view of the front portion of a draw-head. Fig. 2 is a perspective view of one half of the draw-head, the view being taken from the inside dividing-line of the sectional draw-head, and showing the devices in a coupled position. Fig. 3 is a similar view, showing the devices in an uncoupled position, and showing also the lever partly in section.

My invention relates to a novel form of car-coupling designed to couple with cars using the ordinary link in a reliable and automatic manner without danger to the employés of the train.

It consists, principally, in combining with the draw-bar two devices, one of which is in the nature of a U-shaped or double-branched catch, which is pivoted at its bend in the bottom of the draw-bar, and the other of which devices is in the nature of a locking-lever, which is pivoted at its forward end, near the top of the draw-bar, has a chain or rope at its rear end for raising or lowering it, and has in its middle a lug, which is adapted to close the opening in the U-shaped catch to retain the link and also bear against the rear branch of the said catch, so as to hold the front branch in a position to lock the link.

The invention also consists in other features of improvement, as will be hereinafter described, and pointed out in the claims.

In the drawings, A represents the draw-bar, which is made with a tapering throat and of two sections joined longitudinally.

B is the U-shaped catch, which is pivoted near the middle of its bend upon a pin, $a$, in the lower portion of the draw-bar, and is free to move from the position shown in Fig. 2 to the position shown in Fig. 3. When in the unlocked position, as shown in Fig. 3, the forward branch of the U-shaped catch has its upper end on or below a level with the lower surface of the tapering throat of the draw-bar, while the front edge of the rear branch is in position in the throat to be struck by the entering link.

C is the locking-lever, which co-operates with the U-shaped catch to hold the latter in such position as to retain the link when entered. This locking-lever is pivoted at its front end upon a horizontal and transverse pin or bolt, $b$, near the top of the draw-bar, and at its rear end is connected with a rope or chain, $c$, which is worked by a suitable lever or shaft to lift the locking-lever. About the middle of this locking-lever and upon its under side is formed a downwardly-projecting lug, $d$, which latter, when the cars are coupled, rests in the opening of the U-shaped catch to retain the link therein, and also bears against the front side of the rear branch of the U-shaped catch and locks this back, so that the forward branch is held in rigid position to receive the draft strain of the link.

Now, when the cars are to be coupled, the devices are in the position shown in Fig. 3, and when the link of the opposite car enters the draw-bar it strikes the rear branch of the U-shaped catch, and turning this on its pivot backward throws the front branch into the link and allows the lug $d$ on the locking-lever to drop in front of the rear branch, to inclose and hold the link, as shown in Fig. 2.

To prevent the locking-lever C from accidentally jolting up and allowing the catch B to release the link, a chain, D, Fig. 3, is attached to the rear portion of the locking-lever, and extends downwardly through a hole in the draw-bar, and is provided at its end with a ring, $e$, which is of greater diameter than the hole, and which ring, in a measure, limits the upward movement of the locking-lever, so that from ordinary jar or vibration it cannot rise to a point high enough to allow its lug $d$ to pass over the top of the rear branch of the U-shaped catch. When, however, the cars are to be uncoupled, and for this purpose the rear end of the locking-lever is to be positively raised, this additional movement is permitted by a spring-connection between the lever C and the chain D, the said spring-connection consisting of a bolt, $f$, connected with the chain and extending up through a spiral spring, $f'$, in the rear end of the lever, and having at its top a washer, which bears upon the top of the spring.

To guide the rear end of the lever C in its vertical movement two projections, E E, are formed on the top of the draw-bar on each side of the same. The space between these two projections is a tapering space, widest at the top, so that when a chain is used to operate the lever C said chain is not liable to get kinked and jammed in the space between said projections.

With respect to the co-operation between the lug of the lever C and the U-shaped catch, it will be seen that while it serves to hold the link in a horizontal position, it permits the link to incline slightly either above or below its horizontal position, so as to couple with cars of different heights without becoming unlocked.

In distinguishing my invention more clearly I would state that I am aware of the Patent No. 217,145, in which a wheel or rotary catch for the link is pivoted in the middle of the draw-bar and above the position of the link, and is held against the draft-strain by a lug depending from a lever at the top and on the opposite side of its pivot from the link.

In my invention it will be seen that the U-shaped catch is pivoted in the bottom of the draw-bar and below the position of the link, which arrangement brings both the link and the holding-lug of the lever above the pivot of the catch and causes the lug of the lever to perform the additional function of holding the link in the catch, as well as holding the catch against the draft strain.

Having thus described my invention, what I claim as new is—

1. A car-coupling consisting of a draw-bar combined with a U-shaped or double-branched catch pivoted near the middle of its bend in the bottom portion of the draw-bar, below the position of the link, and a locking-lever pivoted in the top of the draw-bar, and having a lug adapted to close the opening in the U-shaped catch, and also form a locking-abutment for the rear branch of said catch, substantially as described.

2. The combination, with the draw-bar A, the U-shaped catch B, and the locking-lever C, of a chain passing through the bottom of the draw-bar and having a stop at its lower end and a spring-connection with the lever above, as and for the purpose described.

3. The combination, with the locking-lever C, of the draw-bar having guide-projections E E, substantially as and for the purpose described.

GEORGE M. ROGERS.

Witnesses:
W. S. ROGERS,
BENJAMIN LINZEE.